US009275048B2

(12) United States Patent
Walker

(10) Patent No.: US 9,275,048 B2
(45) Date of Patent: Mar. 1, 2016

(54) SYSTEM AND METHODS FOR SOLVING INFORMATION RETRIEVAL PROBLEM SETS

(75) Inventor: Reginald L Walker, Los Angeles, CA (US)

(73) Assignee: Tapicu, Inc., Los Angeles, CA (US)

( * ) Notice: Subject to any disclaimer, the term of this patent is extended or adjusted under 35 U.S.C. 154(b) by 304 days.

(21) Appl. No.: 12/657,243

(22) Filed: Jan. 14, 2010

(65) Prior Publication Data

US 2011/0191322 A1    Aug. 4, 2011

Related U.S. Application Data

(60) Provisional application No. 61/278,180, filed on Sep. 9, 2009.

(51) Int. Cl.
*G06F 17/30* (2006.01)
*G06F 7/00* (2006.01)

(52) U.S. Cl.
CPC ..................... *G06F 17/30* (2013.01)

(58) Field of Classification Search
CPC ................................. G06F 17/30598
USPC ......................................... 707/748
See application file for complete search history.

(56) References Cited

U.S. PATENT DOCUMENTS

| | | | |
|---|---|---|---|
| 2008/0301069 A1* | 12/2008 | Chen et al. ...................... | 706/12 |
| 2009/0187525 A1* | 7/2009 | Agrawal et al. ................. | 706/50 |
| 2010/0005051 A1* | 1/2010 | Agrawal et al. ................. | 706/55 |
| 2014/0032455 A1* | 1/2014 | Lye ................................. | 706/13 |
| 2014/0189702 A1* | 7/2014 | Yan et al. ....................... | 718/104 |
| 2014/0189703 A1* | 7/2014 | Gilder et al. ................... | 718/104 |

OTHER PUBLICATIONS

UCLA dissertation title (2003), "Tocorime Apicu: Design of an Experimental Search Engine".
Book Chapter (2004), "Search Engine Development Using Evol. Comp. Methodologies."
Jour. Pub. (2007), "Purposive Behavior of Honeybees as the Basis of an Exp. Search Engine".
Jour. Pub. (2004), "Hierarchical Task Topology for Retrieving Information . . . "
Jour. Pub. (2001), "Search Engine Case Study: Searching the Web using Genetic Prog. . . . "

* cited by examiner

*Primary Examiner* — Jeffrey A Burke

(57) ABSTRACT

An information sharing system to solve one or more information retrieval problems is concerned with the novel, hybrid use of the stochastic optimization techniques of evolutionary computation (EC) search strategies for computer information systems such as search engines, or service oriented architectures (SOAs). The information sharing system uses stochastic optimization agents for task distribution and communication when foraging a system of stored documents for information, assessing the computational effort required to retrieve information in the form of stored documents, sharing information among stochastic optimization agent processes and processors, and extracting knowledge from the information. The field of evolutionary computation encompasses stochastic optimization techniques, such as randomized search strategies, in the form of evolutionary strategies (ES), evolutionary programming (EP), genetic algorithms (GA), classifier systems, evolvable hardware (EHW), and genetic programming (GP). The information sharing system is an attempt to harness information processing models by adapting to information system fluctuations that occur within a computer, a local area network, and a wide area network that encompasses the whole Internet.

5 Claims, 3 Drawing Sheets

SYSTEM AND METHODS FOR SOLVING INFORMATION RETRIEVAL PROBLEM SETS

CROSS-REFERENCE TO RELATED APPLICATIONS

This application claims benefit of provisional application Ser. No. 61/276,180, filed on Sep. 9, 2009 by the present inventor.

FEDERALLY SPONSORED RESEARCH

Not Applicable

SEQUENCE LISTING OR PROGRAM

Not Applicable

BACKGROUND OF THE INVENTION

Field of Invention

The invention relates generally to information sharing systems to solve one or more information retrieval problems. More specifically, the invention is concerned with the novel use of the stochastic optimization techniques of evolutionary computation (EC) search strategies in such an information sharing system such as for search engines, or service oriented architectures (SOAs). The information sharing system uses stochastic optimization agents for task distribution and communication when foraging a system of stored documents for information, assessing the computational effort required to retrieve information in the form of stored documents, sharing information among stochastic optimization agent processes and processors, and extracting knowledge from the information.

The field of evolutionary computation encompasses stochastic optimization techniques, such as randomized search strategies, in the form of evolutionary strategies (ES), evolutionary programming (EP), genetic algorithms (GA), classifier systems, evolvable hardware (EHW), and genetic programming (GP). A common strength of these optimization approaches lies in the use of hybrid algorithms derived by combining one or more of the evolutionary search methodologies.

The stochastic optimization techniques of evolutionary computation (EC) contain mechanisms which enable the representation of certain unique aspects of individual behavior to improve document discovery and clustering. Principles of the stochastic optimization techniques of EC can be found for example in Reginald Louis Walker (2003) "*Tocorime Apicu: Design of an Experimental Search Engine Using an Information Sharing Model*", University of California Dissertation, UMI Dissertation Publishing, Ann Arbor, Mich. 48106-1346, which is incorporated by reference herein in its entirety.

The advent of search engines and service-oriented architectures (SOAs) addressed the shortcomings of early information retrieval (IR) systems. However, current computer information systems are hampered by their reliance on outdated information, the result of an Internet retrieval approach for gathering new and updated documents as opposed to a resource discovery system based on an information sharing model.

The goal of stochastic optimization agents in IR systems is to discover commonalities among distinct subsets of documents by coupling the methodologies of their IR systems with knowledge discovery in databases (KDD). Improved relevance feedback mechanisms determine the quality (fitness) of the requester's database query by computing the degree of fitness between the precision and recall of relevant documents. This terminology stems from two early performance measures used to judge an IR system—how well it captures relevant documents, and how well it rejects the irrelevant.

The methodology for the KDD architecture outlines possible approaches taken by computer information systems to improve their IR systems. The conventional approach provided the requester with query results based on the user's knowledge of respective IR systems. Since a typical user often has a limited knowledge of the structural and search methodologies that pertain to individual computer information systems, the user represents a significant limitation to the current computer information systems. The components comprising the KDD model are: 1) data selection, 2) cleaning—reducing the file complexity, 3) enrichment, 4) coding, 5) data mining—the discovery phase, and 6) reporting.

The benefits of incorporating the KDD model's methodologies include provisions for: 1) long-term vision, 2) mechanisms for updating documents on distributive computers, 3) mechanisms for connecting documents, and 4) mechanisms for interpreting the relations between a diverse collection of files, also known as the formulation of hypertext. The KDD approach, however, derives queries from the resulting databases built by the computer information systems; the IR system, in turn, organizes the database and presents the user with useful information. Thus, the incorporated structure and search methodologies of KDD systems do not require in-depth knowledge by end-users. The KDD IR system does, however, require an intelligent tool coupled with a methodology that eliminates repeated queries and provides useful data back to the end-user for an automated IR system. The intelligent tool in the form of the stochastic optimization agents results from the methodologies of KDD, EC, and distributive computing being coupled, resulting in an information sharing system that encompasses stochastic search strategies The object of the present invention is to overcome these problems in a novel manner using an intelligent tool such as an information sharing system based on fitness-enhancing mechanisms which provide feedback—between the stochastic optimization agents, stochastic optimization regulatory agents, and stochastic optimization further agents—that is a result of previous stochastic measurements and adjustments to workload assignments associated with previous iterations. The resulting system is a methodology that employs the stochastic optimization techniques of EC to implement unique aspects of the information sharing model and apply search strategies to explore the disparate regions of the search space of documents by partitioning the search space among the nodes of the information sharing system. The fitness of a population of solutions can be improved by the non-genetic transmission of cultural information that uses a meme as the transmission mechanism rather than the genetically based genotype.

SUMMARY OF THE INVENTION

According to the invention, there is provided an information sharing system comprising:

a. at least one stochastic optimization agent comprising means for storing a pool of memes, representing a plurality of possible solutions to one or more of the information retrieval problems encoded in a predetermined manner, breeding means for generating new memes from said pool of memes, evaluation means for evaluating said new memes according to predetermined fitness criteria, and selection means for selecting the fittest of the memes to form the solution meme in said pool;

b. at least one stochastic optimization regulatory agent comprising means for storing a pool of memes, representing a plurality of possible solutions to one or more of the information retrieval problems encoded in a predetermined manner, breeding means for generating new memes from said pool of memes, evaluation means for evaluating said memes according to predetermined fitness criteria, and selection means for selecting memes to form the solution meme in said pool;

c. at least two stochastic optimization further agent comprising means for storing a pool of memes, representing a plurality of possible solutions to one or more of the information retrieval problems encoded in a predetermined manner, breeding means for generating new memes from said pool of memes, evaluation means for evaluating said memes according to predetermined fitness criteria, and selection means for selecting memes to form the solution meme in said pool;

d. wherein said stochastic optimization agent includes means for importing/exporting said further memes from/to said other stochastic optimization agents and adding them to said pool for breeding and selection;

e. wherein said stochastic optimization agent includes means for importing/exporting said further memes from/to said stochastic optimization regulatory agents and adding them to said pool for breeding and selection;

f. wherein said stochastic optimization agent includes means for importing/exporting said further memes from/to said stochastic optimization further agents and adding them to said pool for breeding and selection;

g. wherein said stochastic optimization regulatory agents includes means for importing/exporting said further memes from/to said stochastic optimization regulatory agents and adding them to said pool for breeding and selection;

h. wherein said stochastic optimization regulatory agents includes means for importing/exporting said further memes from/to said stochastic optimization further agents and adding them to said pool for breeding and selection;

i. wherein said stochastic optimization further agents includes means for importing/exporting said further memes from/to said stochastic optimization further agents and adding them to said pool for breeding and selection; and j. wherein each said stochastic optimization agent, stochastic optimization regulatory agent, and stochastic optimization further agent includes means to facilitate and optimize a plurality of possible solutions to one or more of the information retrieval problems for an information sharing system—i) a model of stored information, ii) a model for transferring stored information, iii) a model for mutating stored information, and iv) a model for translating stored information into a form against which value judgments can be made.

As will be shown, in such an information sharing system, the stochastic optimization agents, the stochastic optimization regulatory agents, and the stochastic optimization further agents provide a framework within which a number of different problem solving techniques can be integrated, in such way as to achieve synergy between the different techniques. Each stochastic optimization agent coupled with a stochastic optimization regulatory agent and its stochastic optimization further agent(s) is developed as a stand-alone system that can be applied to solve specific problems that fit its application domain.

DETAILED DESCRIPTION-PREFERRED EMBODIMENTS

A preferred embodiment of the present invention is now described with reference to the figures where like reference numbers indicate identical or functionally similar elements and reference to the accompanying drawings.

Figure 1:
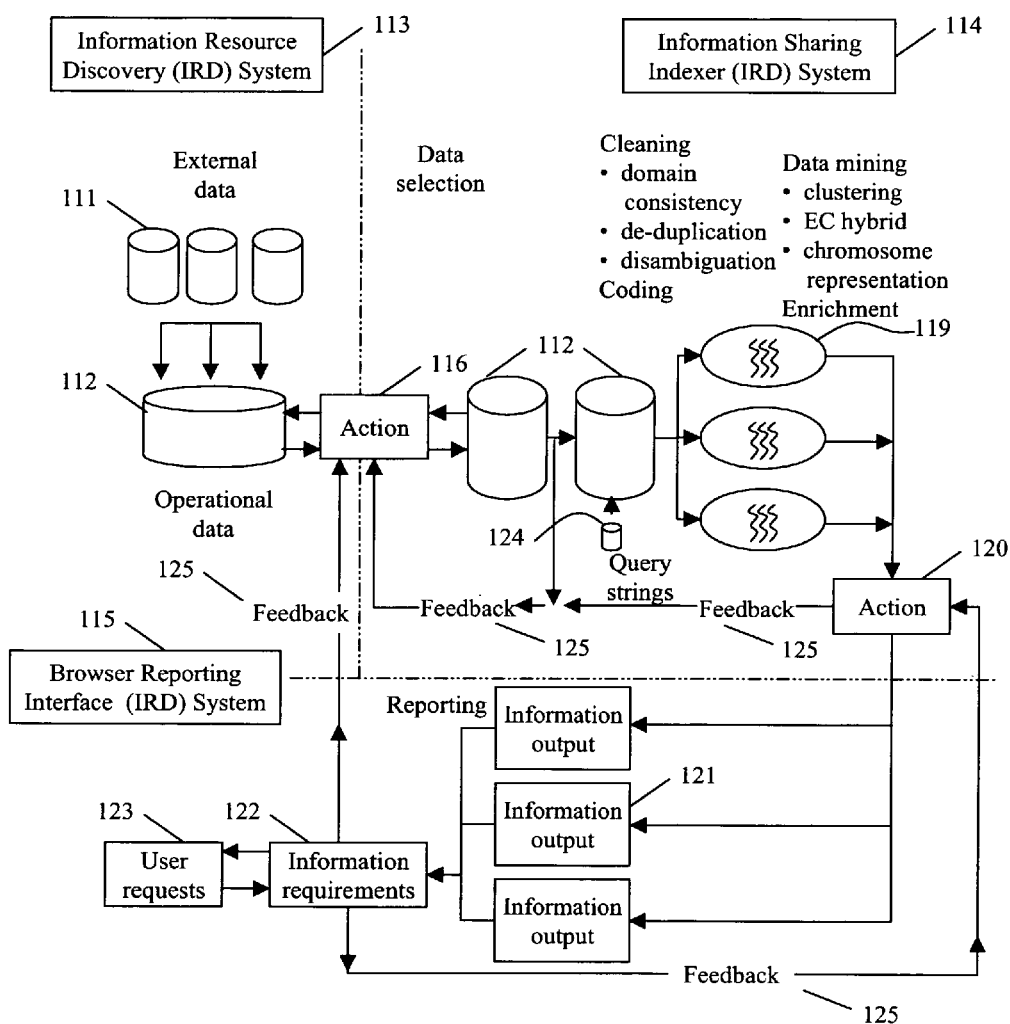
FIG. 1 is the architecture of the present invention.

FIG. 1 shows the information sharing system 10 architecture. The information sharing system is partitioned into four distinct components that use an hierarchical communication topology to access a system of stored information 111,112. The information system components are distributed file system 112, information resource discovery (IRD) system 113, an information sharing indexing (ISI) system 114, and 4) a browser reporting interface (BRI) system 115. The information sharing system encompasses policies and processes that require mechanisms capable of adaptively adjusting operational parameters 116,120,122, and the removal of stop words 124. These parameters are required to filter, organize, and index any large-scale data set 111, information stored within a computer, a local area network, and a wide area network that encompasses the whole Internet, that may consists of constantly fluctuating information content over relatively short periods of time. Additionally, the information sharing system (or its individual components) can be applied to hosts of existing computer information systems that require mechanisms to locate new and updated information in a timely manner, mechanisms to integrate new information into existing knowledge bases, and mechanisms to extract, analyze, and disseminate information from large-scale data sets 111. The pool of query memes 119 is maintained by the distributed file system 112.

The fitness-enhancing mechanisms 116,120,122 provide feedback 125, between the stochastic optimization agents, stochastic optimization regulatory agents, and stochastic optimization further agents, that is a result of previous stochastic measurements and adjustments to workload assignments associated with previous iterations.

Figure 2:
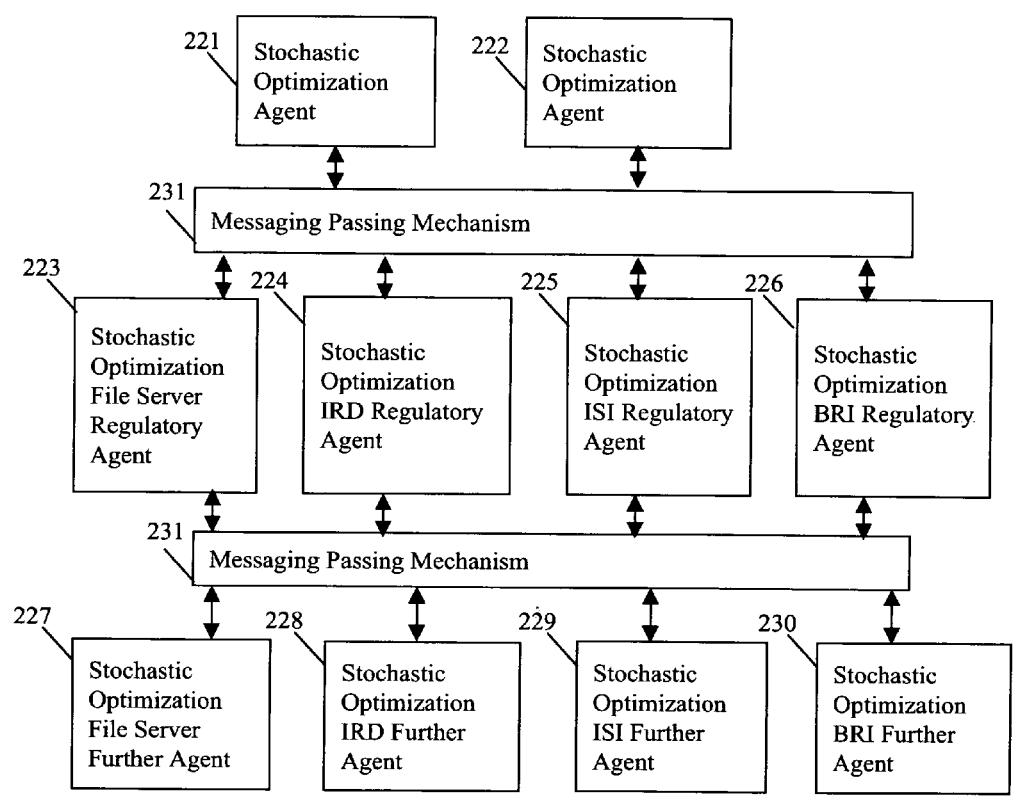
FIG. 2 is a block diagram of an information sharing system embodying the invention.

FIG. 2 shows the information sharing system 10 comprising of a plurality of agents 221-230. These agents may be processes running on separate processors. Alternatively one or more of the agents may run as time-sharing processes on the same processor. The fitness-enhancing mechanisms 116, 120,122 provide feedback—between the stochastic optimization agents 221,222, stochastic optimization regulatory agents 223-226, and stochastic optimization further agents 227-230—that is a result of previous stochastic measurements and adjustments to workload assignments associated with previous iterations. The agents can communicate with each other by a message passing mechanism 231, which allows any one of the agents to send a message to any other agents.

The information sharing system design—a result of the integration of various components which include the stochastic optimization agents 221,222, stochastic optimization regulatory agents 223-226, and stochastic optimization further agents 227-230. The distinct stochastic optimization regulatory agent hierarchy will be:
1. stochastic file server optimization regulatory agent 223 (File Server System 112 for Event $E_0$), $M_0$
2. stochastic optimization IRD regulatory agent 224 (Information Resource Discovery System 113 for Event $E_1$), $M_1$
3. stochastic optimization ISI regulatory agent 225 (Information Sharing Indexing System 114 for Event $E_2$), $M_2$
4. stochastic optimization BRI regulatory agent 226 (Browser Reporting Interface System 115 for Event $E_3$), $M_3$.

A single node, a computer processor in the distributed information sharing system, represents the stochastic optimization regulatory agents 223-226, $M_i$, for each event set, $E_i$. Each stochastic optimization regulatory agent 223-226 may time share its processor with at least one corresponding stochastic optimization further agents 228-230 and one stochastic file server optimization further agent 227.

The load-balancing model for all $M_i$ 224,225 has the responsibility for ensuring that no document duplication occurs among the stochastic optimization further agents 228, 229 executing the instructions that comprise its event set, $E_i$. $M_1$ 224 has to ensure that the network path order used by the stochastic optimization further agents 228 remains distinct. The load-balancing model for $M_2$ 225 has the responsibility of ensuring that no document duplication occurs within the ISI system 114 among the stochastic optimization further agents 229 executing the instructions that comprise its event set, $E_2$. Also, coupled with the fact that each meme can not be discarded after the application of the evolutionary computation (EC) operators—the traditional view of the effects of the EC optimization techniques are modified. The difference between the two includes the fact that genetic transmissions (stochastic selection process) evolve over a period of generations, whereas cultural transmissions result from an educational process. The transmission of cultural information can be facilitated by preserving in memory the fitness evaluations associated with a previous generation using an indexed memory scheme. The load-balancing model for $M_3$ 226 has the responsibility of ensuring that no document duplication occurs in the stochastic optimization further agents 230 results when presenting relevant documents 121 to a user's query 123 for event set $E_3$. The responsibilities associated with $M_3$ can be expanded to encompass the clustering of external data sources 111. Dynamic load-balancing schemes associated with EC can be used to dynamically regulate the irregularity in workload assignments that results from the processor's retrieving and parsing of variable-sized documents which follow the theories associated with the implementation of event managers (EM) 221,222,223-226.

The system includes at least one stochastic optimization agent 221, capable of solving one or more information retrieval problems by stochastic optimization techniques of evolutionary computations. The other stochastic optimization agent 222, when present, functions as a monitor for the stochastic optimization regulatory agents 223-226. In this example, there are two stochastic optimization agents 221, 222 but in other examples there may be only one or more stochastic optimization agents. The stochastic optimization agent will be described in more detail below.

The system includes at least one stochastic optimization regulatory agents 223-226, which are capable of solving one or more information retrieval problems by stochastic optimization techniques of evolutionary computations. In this example, there are at least four stochastic optimization regulatory agents which comprise a stochastic optimization file server regulatory agent 223, a stochastic optimization IRD regulatory agent 224, a stochastic optimization ISI regulatory agent 225, and a stochastic optimization BRI regulatory agent 226. The stochastic optimization regulatory agent will be described in more detail below.

The system includes at least two stochastic optimization further agents 227-230, which are capable of solving one or more information retrieval problems by stochastic optimization techniques of evolutionary computations. In this example, there are four stochastic optimization further agents which comprise of a stochastic optimization file server further agent 227, a stochastic optimization IRD further agent 228, a stochastic optimization ISI further agent 229, and a stochastic optimization BRI further agent 230.

The stochastic optimization agent 221 maintains a central pool of memes that have been offered for export by the stochastic optimization BRI regulatory agent 230 for user requests 123. In this case, whenever stochastic optimization agent 221 requires to import a new meme, it would obtain it from this central pool maintained by the stochastic optimization file system regulatory agent 223 and stochastic optimization BRI regulatory agent 230.

In operation, each of the agents 221-230 attempts to create possible solutions to a given problem set, using its own particular hybrid of the stochastic optimization techniques of evolutionary computation. Each of these possible solutions is encoded in some predetermined manner, for example a chromosome of documents. The encoded solution is referred to as a "meme". Each group of stochastic optimization agents uses unique predetermined meme coding scheme using the transmission of cultural information by preserving in memory the fitness evaluations associated with a previous generation using an indexed memory scheme.

Figure 3:
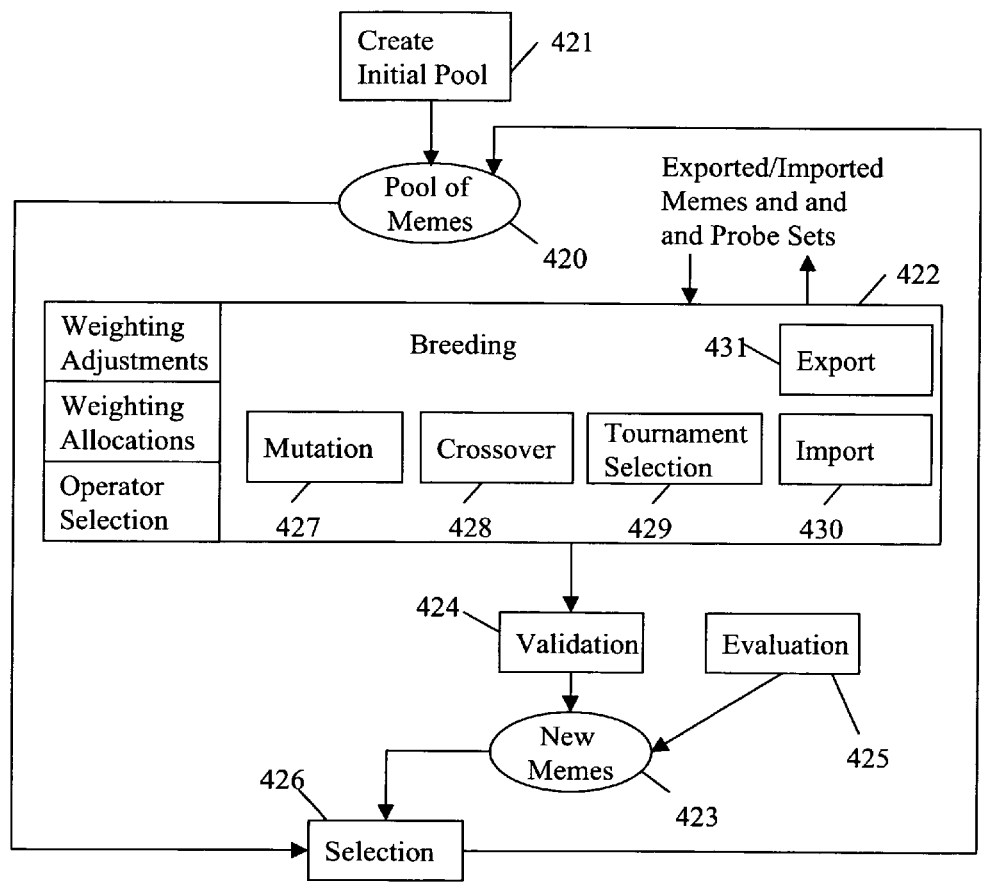
FIG. 3 is a schematic diagram illustrating a stochastic optimization agent, stochastic optimization regulatory agent, and stochastic optimization further agent forming the information sharing system.

FIG. 3 shows the breeding, validation, evaluation, and selection processes which are executed cyclically, to produce successive generations of memes. This loop continues forever with the goal of always attempting to generate a better meme. The goal of continuously applying the stochastic optimization regulatory mechanisms is to improve the subclustering of documents. The agents 221-230 maintain a pool of query memes 420, representing a current generation of solutions to the problem in question. When the agents 221-230 are started up, a process 421 creates an initial generation of memes, for example by randomization, or by using memes stored from a previous run.

The agents 221-230 includes a breeding process 422 (comprised of weighting adjustments, weighting allocations, and operator selection), which processes the memes in the pool 420, to produce a set of new memes 423. Each new meme passes through a validation process 424 which checks whether the meme fitness satisfies any problem-specific information retrieval constraints. The validation process performs a "meme-repair" operation, by searching for values which satisfy the constraints.

The agents 221-230 also includes an evaluation process 425, which evaluates new memes, to produce a fitness value for each one, indicating how good a solution the meme represents. The agent further includes a selection process 426 which selects the best of the memes (both from the meme pool 420 and the new meme set 423, and places the selected memes in the meme pool.

The breeding process 422 comprises a number of operators, including a mutation operator 427, a crossover operator 428, tournament selection operator 429, an import operator 430, and an export operator 431. Each of these operators has a weighting value associated with it, which determines the probability of using the operator. These weighting values are adjusted for successive generations, so as to increase the probability of use of those operators that produce fitter memes.

The mutation operator 427 takes one of the memes from the pool 420, and mutates it in some manner. The crossover operator 428 selects from the pool 420 as "parents", and updates the two "parent" memes, by swapping part of their genetic information. The memes are chosen randomly. A crosspoint is randomly selected. The first updated "parent" meme is created by replacing the genetic content of the first meme following the crosspoint with the genetic content of the second meme following the crosspoint. Similarly, The second updated "parent" meme is created by replacing the genetic content of the second meme following the crosspoint with the genetic content of the first meme following the crosspoint. It will be appreciated that in practice other forms of crossover operator may be used, depending on the way the memes are encoded.

The tournament selection operator 429 selects from the pool 420 two or more memes as "parents", and updates two or more "parent" memes from these, by swapping part of their genetic information (multiple applications of the crossover operator 428) that stems from overlapping nearest neighbor clusters (NNCs) and is equivalent to sharing information between species of individuals.

The import operator 430 sends an import message to one or more of the other agents 221,222 in the system, one or more of the stochastic optimization regulatory agents 223-226 in the system, and one or more of the stochastic optimization further agents 227-230 in the system, requesting that it send the memes so far created by the other agents. When the requested memes are received, they are validated and added to the set of new memes 423 in exactly the same way as the locally generated memes, produced by the mutation, crossover, and tournament selection operators. The imported meme will then be available for use by the requesting agents 221-230.

The export operator 431 sends an export message to one or more of the stochastic optimization agents 221, in the system, one or more of the stochastic optimization regulatory agents 223-226 in the system, and one or more of the stochastic optimization further agents 227-230 in the system, indicating that it has updated memes ready to send to the other agents. When the requested memes are received, they are validated and added to the set of new memes 423 in exactly the same way as the locally generated memes, produced by the mutation and crossover, and tournament selection operators. The exported meme will then be available for use by other agents 221-230.

These optimization techniques form the basis of the agents 221-230 for the information sharing system 10—migration of documents between processes/processors/computers within the local area network (LAN). The stochastic optimization regulatory agents 223-226 permits the information sharing system to escape from local optima in its attempts to gather related documents by analyzing content and creating information fluctuations among the stochastic optimization ISI regulatory agent 225 and stochastic optimization ISI further agent 229.

In summary, it can be seen that the stochastic optimization agents, the stochastic optimization regulatory agents, and stochastic optimization further agents will constantly import and export fit-looking memes and try to evolve them into even fitter individuals.

In terms of solving commercial problems this has a particularly important advantage. As more problem-tailored approaches are developed, new agents can then be simply added into the architecture without changing the existing agents. This effectively de-risks developments in one of the most high-risk areas of current computer application development.

It will be appreciated that many modifications may be made to the system described above without departing from the scope of the present invention. For example, some possible modifications are as follows.

A mechanism may be provided to keep track of the sources of memes, so as to keep a history of which techniques worked best at what stage of optimization.

While particular embodiments and applications of the present invention have been illustrated and described herein, it is understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

I claim:

1. A system for applying stochastic optimization techniques of evolutionary computation using a plurality of stochastic optimization agents, said stochastic optimization techniques of evolutionary computation aiming to optimize meme pools against one or more fitness criteria, said system for applying stochastic optimization techniques of evolutionary computation to the generation of pools of memes for sets of one or more search query terms including the steps of:

transmitting, by a hardware processor, at least one meme by a pools of memes, cultural information resulting from an educational process applied to meme pools;

storing, in memory, a pool of memes generated from cultural information for the population of individuals meme pool by a plurality of stochastic optimization agents;

generating, by a hardware processor, at least one meme from cultural information for transmission in one or more pools of memes by a plurality of stochastic optimization agents;

evaluating, by a hardware processor, the fitness of said meme pool according to predetermined fitness criteria using at least one transmitted pool of memes obtained from cultural information by a stochastic optimization agent;

selecting, by a hardware processor, the fittest memes to form pools of memes from the meme pool for the transmission of cultural information by a plurality of stochastic optimization agents;

identifying, by a hardware processor, at least one meme from the imported pools of memes best satisfying said one or more adaptive stochastic fitness criteria, based on the results of the evaluation step;

formulating, by a hardware processor, requests of one or more pools of memes from a plurality of stochastic optimization agents based on a transmitted pool of memes obtained from cultural information that meets predetermined fitness criteria;

requesting, by a hardware processor, from a plurality of stochastic optimization agents pools of memes to be imported by a plurality of stochastic optimization agents;

responsive to requesting steps, exporting at least one pool of memes obtained from cultural information to a plurality of requesting and non-requesting stochastic optimization agents;

responsive to requesting steps, importing at least one pool of memes by a plurality of requesting and non-requesting stochastic optimization agents.

2. The system of claim 1, further comprising the storing, generating, evaluating, selecting, formulating, and requesting steps; each step using at least one fittest meme obtained from cultural information transmission to produce expanded meme pools by stochastic optimization agents.

3. The system of claim 1, further comprising: the storing, requesting, generating, evaluating, formulating, and selecting steps: each step sharing pools of memes and meme pools with storing, generating, evaluating, and selecting steps of non-requesting stochastic optimization agents.

4. The system of claim 1, further comprising: initial steps of creating the first pool of memes including at least one meme from cultural information transmission at said plurality of said storing, requesting, generating, evaluating, formulating, and selecting steps of a plurality stochastic optimization agent.

5. The system of claim 1, further comprising: importing and exporting steps using a plurality of stochastic optimization agents said means for importing and exporting at least one pool of memes within meme pools by stochastic optimization techniques of evolutionary computation including the steps of breeding meme pool by applying cultural information obtained from the import of one or more pool of memes provided by a diverse set of stochastic optimization agents;

validating meme pool against requested and non-requested cultural information of one or more pool of memes provided by a diverse set of stochastic optimization agents;

evaluating the fitness of the meme pool against one or more pool of memes provided by a diverse set of stochastic optimization agents;

generating requested pool of memes from the meme pool satisfying cultural information requests to be exported to a plurality of requesting and non-requesting stochastic optimization agents; and generating non-requested pool of memes from the meme pool satisfying cultural information to be exported to a plurality of non-requesting stochastic optimization agents.

* * * * *